United States Patent
Ammu et al.

(10) Patent No.: US 8,837,602 B2
(45) Date of Patent: Sep. 16, 2014

(54) CONTENT ADAPTIVE VIDEO ENCODER AND CODING METHOD

(75) Inventors: Satya Ghosh Ammu, Alton Hampshire (GB); Alois Martin Bock, Eastleigh Hampshire (GB); Ryan Spicer, Basingstoke Hampshire (GB)

(73) Assignee: Telefonaktiebolaget L.M. Ericsson (publ), Stockholm (SE)

( * ) Notice: Subject to any disclaimer, the term of this patent is extended or adjusted under 35 U.S.C. 154(b) by 675 days.

(21) Appl. No.: 12/994,036

(22) PCT Filed: May 22, 2008

(86) PCT No.: PCT/EP2008/056335
§ 371 (c)(1),
(2), (4) Date: Nov. 22, 2010

(87) PCT Pub. No.: WO2009/141011
PCT Pub. Date: Nov. 26, 2009

(65) Prior Publication Data
US 2011/0069757 A1 Mar. 24, 2011

(51) Int. Cl.
H04N 7/18 (2006.01)
H04N 19/53 (2014.01)
H04N 19/142 (2014.01)
H04N 19/114 (2014.01)
H04N 19/87 (2014.01)
H04N 19/137 (2014.01)
H04N 19/172 (2014.01)
H04N 19/61 (2014.01)
H04N 19/177 (2014.01)

(52) U.S. Cl.
CPC ....... *H04N 19/006* (2013.01); *H04N 19/00163* (2013.01); *H04N 19/00054* (2013.01); *H04N 19/00921* (2013.01); *H04N 19/00145* (2013.01); *H04N 19/00266* (2013.01); *H04N 19/00781* (2013.01); *H04N 19/00284* (2013.01)
USPC ................................. 375/240.26; 375/240.12

(58) Field of Classification Search
CPC . H04N 7/50; H04N 7/26941; H04N 21/2365; H04N 21/4347
USPC ........................................ 375/240.01–240.29
See application file for complete search history.

(56) References Cited

U.S. PATENT DOCUMENTS

| | | | |
|---|---|---|---|
| 6,125,147 A * | 9/2000 | Florencio et al. | 375/240.29 |
| 6,229,925 B1 | 5/2001 | Alexandre et al. | |
| 6,463,101 B1 | 10/2002 | Koto | |
| 6,480,540 B1 | 11/2002 | Guillotel | |

(Continued)

*Primary Examiner* — Andy Rao
(74) *Attorney, Agent, or Firm* — Nixon & Vanderhye P.C.

(57) ABSTRACT

A method of pre-processing a sequence of video picture data comprising I pictures, P pictures and B pictures, where the pictures are arranged as a plurality of Group Of Pictures (GOP) and each of the Group Of Pictures has a first picture and a plurality of Sub Group of Pictures (Sub-GOP). The method uses an analysis of the sequence of video picture data to determine a position of a scene change relative to a position of a start of a new GOP within the sequence of video picture data and then moves the start of the new GOP to coincide with the scene change by extending or decreasing a current GOP length according to whether the scene change and the start of a new GOP are within a predetermined number of pictures of each other. An apparatus for carrying out the method is also provided.

13 Claims, 9 Drawing Sheets

(56) References Cited

U.S. PATENT DOCUMENTS

| | | |
|---|---|---|
| 6,934,335 B2 | 8/2005 | Liu |
| 6,959,044 B1 | 10/2005 | Jin et al. |
| 7,564,901 B2 * | 7/2009 | Wang et al. .............. 375/240.03 |
| 2002/0150160 A1 | 10/2002 | Liu |
| 2004/0042548 A1 * | 3/2004 | Yu et al. ................... 375/240.03 |
| 2006/0045183 A1 | 3/2006 | Bock |

* cited by examiner

Start of new GOP 201

Scene Cut 202

Current GOP 210

Next GOP 220

Extension of GOP

Start of new GOP and Scene cut 203

Scene Cut
202b

Delayed start of new
GOP and Scene cut
203b

Fig.5.

| Num  | 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 |
|------|---|---|---|---|---|---|---|---|---|---|-----|-----|-----|-----|-----|-----|-----|-----|-----|-----|-----|-----|-----|-----|-----|
| Type | I | B | B | P | B | B | P | B | B | P | B   | B   | P   | B   | B   | I   | B   | B   | P   | B   | B   | P   | B   | B   | P   |

Start of GOP 201 → (at frame 15)

Fig.6.

| Num  | 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 |
|------|---|---|---|---|---|---|---|---|---|---|-----|-----|-----|-----|-----|-----|-----|-----|-----|-----|-----|-----|-----|-----|-----|
| Type | I | B | B | P | B | B | P | B | B | P | B   | B   | I   | B   | B   | I   | B   | B   | P   | B   | B   | P   | B   | B   | P   |

Scene cut 202 → (at frame 12)
Start of next Normal fixed size GOP 204 → (at frame 15)

Fig.7.

Start of new GOP and Scene cut 203

| Num | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Type | I | B | B | P | B | B | P | B | B | P | B | B | I | B | B | P | B | B | P | B | B | P | B | B | P |

Fig.8.

Start of GOP 201

Scene cut 202

| Num | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Type | I | B | B | P | B | B | P | B | B | P | B | B | P | B | B | I | B | B | P | B | B | I | B | B | P |

Fig.9.

Start of new GOP and Scene cut 203

| Num | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Type | I | B | B | P | B | B | P | B | B | P | B | B | P | B | B | P | B | B | P | B | B | I | B | B | P |

Fig. 10.

| | a0 | a1 | a2 | a3 | ← Line N |
|---|---|---|---|---|---|
| Line (N+1) → | b0 | b1 | b2 | b3 | |
| | c0 | c1 | c2 | c3 | ← Line (N+2) |
| Line (N+3) → | d0 | d1 | d2 | d3 | |

Fig. 11.

| Num | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Type | I | B | B | P | B | B | P | B | B | P | B | B | P | B | B | I | B | B | P | B | B | P | B | B | P |

Arrows point left at positions 3, 4, 6, 7, 10, 12, 13, 16, 17, 19, 20, 22, 23.

Fig. 12.

| Num | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| Type | I | B | B | P | B | B | P | B | B | P | B | B | P | B | B | I | P | P | P | P | P | P | P | P | P |

Arrows point right at positions 13, 14, 16, 17, 19, 20, 22, 23.

CONTENT ADAPTIVE VIDEO ENCODER AND CODING METHOD

This application is the U.S. national phase of International Application No. PCT/EP20081056335, filed 22 May 2008, the entire contents of which is hereby incorporated by reference.

TECHNICAL FIELD

The invention is related to video coding in general, and in particular to pre-processing video data for use in optimising MPEG2 encoded video.

BACKGROUND

The ISO (International Organization for Standardization)/IEC (International Electrotechnical Commission) video compression standards (for example, ISO/IEC 13818-2, reference 1, commonly known as the Motion Picture Expert Group (MPEG) 2 standard) define three types of coded pictures for use in the digitally coded video made according to the standards:

An I picture: which is an Intra-Field or Frame coded picture with no inter frame prediction used.

A P picture: which is a predictively coded picture with uni-directional inter frame prediction from a previous picture only; and A B picture: which is a predictively coded picture with bi-directional inter frame predictions from both previous and future pictures.

Thus, I and P pictures can be used as reference pictures for inter frame temporal predictions for other P and B pictures. Some implementations, for example the H.264 specification, allow B pictures to be used as reference pictures for other B pictures. Such B pictures are called Reference B. Meanwhile, P pictures are differentially coded and so produce smaller file sizes than I pictures when coded; similarly B pictures produce even smaller file sizes. It is therefore beneficial to reducing the capacity needed to transmit or store MPEG2 video streams (i.e. sequences) that few I pictures and relatively more P and B pictures are used.

A contiguous sequence of pictures starting with an I picture and finishing with the picture before the next I picture is called a Group Of Pictures or GOP. P and B pictures are used between the I pictures, in order to reduce the video stream size.

The interval between I pictures (reference pictures) is known as a GOP Length, and the interval between P pictures is known as Sub-GOP Length. The order of the pictures in a GOP length is knows as a GOP Structure.

The arrangement of I, P and B pictures is governed by the MPEG2 specification, however no particular GOP length or structure (i.e. GOP parameters) is defined, and so it is left to manufacturers and users to choose the appropriate GOP parameters for any specific application.

The assumption inherent in the MPEG2 specification is that once chosen, the GOP parameters are fixed, i.e. it is not normally expected that the GOP would vary dynamically in size and structure. However, the specification does not definitively prohibit this.

Variable GOP has been used in the past, in order to ease difficulties arising in scalable MPEG video coding, where scalable means the ability to decode the bitstream representative of the encoded video at different quality levels, resolutions and frame rates.

An example of variable GOP scalable coding is provided in document WO2005086493A1. In this case, the GOP parameters are set so as to permit different decoder systems with different capabilities to be able to decode and render the video material. The GOP length is not adapted, but a second GOP differing from the normal one in length only, is selected if that option causes the coding cost, as measured by some parameter, to be lower. This type of scheme is specific to scalable coding and it is not flexible and does not adapt itself closely to the behaviour of the picture sequence. It does not deal specifically with defects in coding caused by practical factors such as scene changes, fades, flashes, temporal or special complexity, and the like. Meanwhile, using static (i.e. fixed) sized/structured GOPs leads to sub-optimal coding performance.

It is therefore an object of the present invention to deal with such matters and improve the practical performance of MPEG2 coding.

SUMMARY

In a first aspect of the present invention, there is provided a method of pre-processing a sequence of video picture data, where the sequence of video picture data comprising I pictures, P pictures and B pictures arranged as a plurality of Group Of Pictures, GOPs, and each of the plurality of Group Of Pictures has a first picture and a plurality of Sub Group of Pictures, Sub-GOPs. In the described method, the sequence of video picture data is analysed to determine a position of a scene change relative to a position of a start of a new GOP within the sequence of video picture data, such that information is provided to a video encoder to move the start of the new GOP to coincide with the scene change by extending or decreasing a current GOP length. This is done if the scene change and the start of a new GOP are within a predetermined number of pictures.

In this way, the frame by frame behaviour of the source sequence of video data (the content), rather than a fixed set of options adapts the GOP parameters for optimal coding. Further, the method enables fewer I frames to be used for any given sequence of video data, therefore the encoded data size is smaller, hence allowing faster processing, and lower storage requirements in the encoder/decoder.

Optionally, if the information provided indicates to move the start of the new GOP by extending the current GOP length, the step of extending comprises creating one or more new Sub-GOPs out of P and B pictures, and inserting the newly created one or more Sub-GOPs into the current GOP until the current GOP is of a sufficient length. The step of creating the one or more new Sub-GOP may comprise providing a first P picture as the last picture of the one or more sub-GOP, and inserting B or P pictures previous to the first P picture up to a desired length of Sub-GOP.

Optionally, if the information provided indicates to move the start of the new GOP by decreasing the current GOP length, the step of decreasing the current GOP length comprises inserting an I picture as a first picture of a new GOP at the scene change to start a new GOP, creating one or more new Sub-GOPs out of P and B pictures, and inserting the newly created one or more Sub-GOPs into the new GOP until the new GOP is of a sufficient length. The step of creating the one or more new Sub-GOP may comprise providing a first P picture as the last picture of the one or more sub-GOP, and inserting B or P pictures previous to the first P picture up to a desired length of Sub-GOP.

Optionally, the picture type of the pictures inserted into a newly created Sub-GOP is dependent on metrics of the video picture data, including Spatial complexity metrics; Temporal complexity metrics; Fade activity metrics; Flash activity metrics; Scene change metrics; and Bit rate metrics.

Optionally, the picture type content of the pictures inserted in to a newly created Sub-GOP is B type pictures, unless an analysis of the sequence of video picture data finds the following Boolean equation to be true: (Temporal displacement of the sequence of video picture data>=first predetermined value) OR (Temporal distortion of the sequence of video picture data>=second predetermined value) OR (Temporal displacement<=third predetermined value AND Spatial complexity<=fourth predetermined value AND bitrate<=a predetermined rate) AND (no flashes occur OR no fades occur), in which case P pictures are used in the newly created sub-GOP. In the aforementioned criteria, the temporal displacement and temporal distortion are temporal complexity metrics, and flash activity metrics comprise detecting whether flashes occur in a Sub-GOP under test, to provide the 'no flashes occur' Boolean value, while fade activity metrics comprise detecting whether a fade occurs in the Sub-GOP under test, to provide the 'no fades occur' Boolean value.

Optionally, the first predetermined value is 16, the second predetermined value is (256*16), the third predetermined value is 5, the fourth predetermined value is 2560, and the predetermined bitrate is 2 megabits per second.

Optionally, a scene change may comprise a scene cut or splice point in an edited sequence of video data.

Optionally, if the scene change is a splice point, the method further comprises providing information to the encoder indicative of inserting an I picture at the splice point, and converting all pictures in the Sub-GOP preceding the splice point into P pictures.

Optionally, the sequence of video picture data comprises interlaced video data such that each picture comprises a top and bottom field, and if the scene change is a scene cut, the method further comprises providing information to the encoder indicative of inserting an I picture on a reference picture of the next sub-GOP if the scene cut occurs on a bottom field of a last picture of the sub-GOP under test.

Optionally, the predetermined number of pictures is 6.

The method is typically applied to each Sub-GOP in a sequence of video picture data in turn.

Whether it is P or B pictures that are inserted may depend on whether there are flashes or fades detected in the sequence of video data being processed.

In a second aspect of the invention, there is provided a method of pre-processing a sequence of video picture data, where the sequence of video picture data comprises I pictures, P pictures and B pictures arranged as a plurality of Group Of Pictures, GOPs, and each of the plurality of Group Of Pictures has a first picture and a plurality of Sub Group of Pictures, Sub-GOPs. The method involves analysing the sequence of video picture data to determine metrics about the sequence of video picture data and converting B pictures to P pictures in a section of the sequence of video picture data dependent upon the metrics for the said section of the sequence of video picture data fulfilling predetermined criteria.

The metrics about the sequence of video picture data used in the adaptive GOP structure method may include any one or more of: Spatial complexity metrics; Temporal complexity metrics; Fade activity metrics; Flash activity metrics; and Bit rate metrics.

Optionally, the method may further comprise detecting flashes or fades in the section of the sequence of video picture data, wherein the step of converting B pictures to P pictures occurs if the section of the sequence of video picture data has high temporal complexity, or the section of the sequence of video picture data has low spatial and temporal complexity at lower bit rates, and no flashes or fades are detected in the section of the sequence of video picture data.

The conversion of B pictures to P pictures may occur only if the following predetermined criteria are fulfilled:

(Temporal displacement of the sequence of video picture data>=first predetermined value) OR (Temporal distortion of the sequence of video picture data>=second predetermined value) OR (Temporal displacement<=third predetermined value AND Spatial complexity<=fourth predetermined value AND bitrate<=a predetermined rate) AND (no flashes occur OR no fades occur), where temporal displacement and temporal distortion are temporal complexity metrics.

In a third aspect of the invention, there is provided a video pre-processor apparatus for pre-processing a sequence of video picture data, where the sequence of video picture data comprises I pictures, P pictures and B pictures arranged as a plurality of Group Of Pictures (GOP) and where each Group Of Pictures has a first picture and a plurality of Sub Group of Pictures (Sub-GOP). The pre-processor including a video sequence analyser adapted to analyse the sequence of video picture data, including a position determination processor adapted to determine a position of a scene change relative to a position of a start of a new GOP within the sequence of video picture data and a GOP adaptation circuit adapted to provide information to a video encoder to move the start of the new GOP to coincide with the scene change by extending or decreasing a current GOP length dependent upon output metrics of the video sequence analyser, if the scene change and the start of a new GOP are within a predetermined number of pictures.

In a fourth aspect of the invention, there is provided a video pre-processor apparatus for pre-processing a sequence of video picture data, where the sequence of video picture data comprises I pictures, P pictures and B pictures arranged as a plurality of Group Of Pictures (GOP) and each of the Group Of Pictures has a first picture and a plurality of Sub Group of Pictures (Sub-GOP). The video pre-processor apparatus comprises a video sequence analyser adapted to analyse the sequence of video picture data to determine metrics about the sequence of video picture data and a GOP adaptation circuit adapted to provide information to a video encoder such that the video encoder converts B pictures to P pictures in a section of the sequence of video picture data dependent upon the metrics for the said section of the sequence of video picture data fulfilling predetermined criteria.

The video sequence analyser may further comprise one or more of: a scene change detector adapted to detect a scene change in the sequence of video picture data; a fade detector adapted to detect a fade in the sequence of video picture data; a flash detector adapted to detect a flash in the sequence of video picture data; a hierarchical motion estimator adapted to provide temporal metrics of the sequence of video picture data; a spatial complexity estimator adapted to provide spatial complexity metrics of the sequence of video picture data; a first buffer for buffering the sequence of video picture data for use in any of the detector or estimators; and a delay for delaying the output of the second buffer.

Each application requiring different GOP parameters can be accommodated by having flexible adjustment available within the coding hardware or software employed.

In a still further aspect of the present invention, there is provided a method of pre-processing video data comprising analysing video data comprising a sequence of pictures including a plurality of GOPs, determining a position of a scene cut relative to the position of a start of a GOP, altering a GOP length of a first GOP situated before the scene cut in time, such that the first GOP ends one picture before the scene cut, and starting a new GOP from the scene cut.

BRIEF DESCRIPTION OF THE DRAWINGS

A method of pre-processing video data will now be described, by way of example only, with reference to the accompanying drawings in which:

FIG. 3b shows an illustration of how a GOP Length may be adapted according to an embodiment of the invention for the example of FIG. 3a;

FIG. 4b shows an illustration of how a GOP Length may be adapted according to an embodiment of the invention for the example of FIG. 4a;

FIG. 5 shows the original display order of an exemplary sequence of I, P and B frames before an embodiment of the invention is applied;

FIG. 6 shows prior art handling of a scene cut at frame 12 of the sequence of FIG. 5;

FIG. 7 shows handling of a scene cut at frame 12 of the sequence shown in FIG. 5 according to an embodiment of the invention;

FIG. 8 shows prior art handling of a scene cut at frame 21 of the sequence shown in FIG. 5;

FIG. 9 shows handling of a scene cut at frame 21 of the sequence shown in FIG. 5 according to an embodiment of the invention;

FIG. 10 shows an exemplary 4×4 block of pixels used in spatial complexity computation according to an embodiment of the invention;

FIG. 11 shows prior art handling of a section of fast moving imagery between frames 13 to 23 of the sequence shown in FIG. 5;

FIG. 12 shows handling of a section of fast moving imagery between frames 13 to 23 of the sequence shown in FIG. 5, according to an embodiment of the invention;

DETAILED DESCRIPTION

Figure 1:
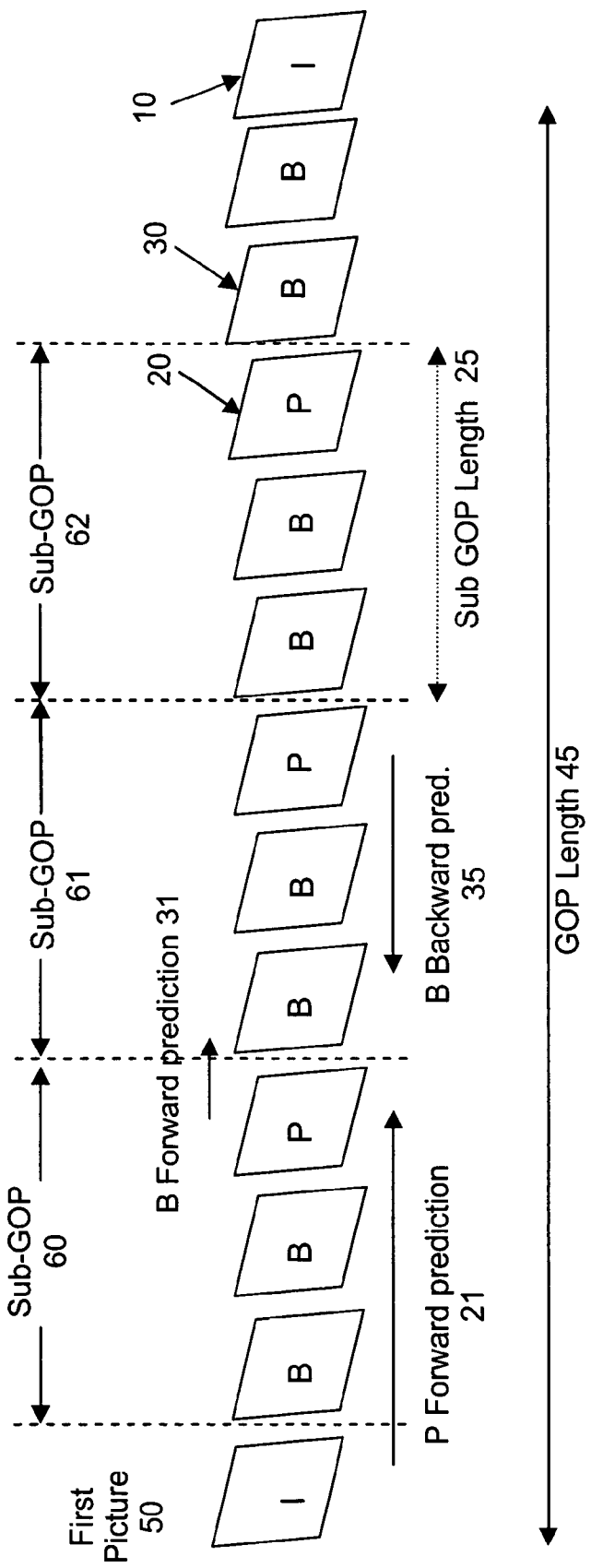
FIG. 1 shows an illustration a GOP length and GOP structure according to a video coding standard, such as MPEG2.

An embodiment of the invention will now be described with reference to the accompanying drawings in which the same or similar parts or steps have been given the same or similar reference numerals.

FIG. 1 depicts a contiguous sequence of pictures, forming a sequence of video picture data, made up from I pictures 10, P pictures 20 and B pictures 30. In the example shown, the GOP length 45 is twelve and the Sub-GOP length 25 is three. FIG. 1 also shows the direction of temporal predictions for P and B pictures. In particular, there is shown the forward prediction used for P pictures 21, the forward prediction used for B pictures 31, and the backwards prediction used for B pictures 35.

FIG. 1 also shows the general form of a GOP, i.e. a first picture 50 (an I picture), followed by a first sub-GOP 60, and further sub-GOPs 61 and 62, etc.

As mentioned previously, the MPEG2 standard does not define a particular GOP length 45 and Sub-GOP length 25, therefore they can be fixed or varied. Varying the GOP Length 45 and the GOP Structure based on the content of the sequence as proposed in this invention maximizes the compression achieved, as well as improving the picture quality by detecting and adapting the coding to the content of the encoded video itself, thereby avoiding defective coding.

For best coding efficiency it is clear that the GOP Length 45 should be very long, however this can lead to practical problems and so typical GOP lengths 45 are limited. This is because predicted errors can propagate through the GOP, as the subsequent predicted pictures make use of previous predicted pictures with errors in them, and hence pass on the error.

Consider the scenario where a scene cut follows a few pictures after the end of a GOP. Then, it is good to extend the previous GOP and start the new GOP by inserting an I frame at the scene cut, to avoid rate control buffer fluctuations.

Meanwhile, fast moving sequences with large global pans are better coded by turning B pictures off (i.e. use only P pictures), whereas slow moving sequences or sequences with fades and camera flashes are better coded with B pictures. So it is advantageous to adapt the GOP length and GOP Structure based on the video content to maximize the compression achieved and thus improve the perceived video quality. The proposed Adaptive GOP Length and GOP Structure method is explained in more detail below.

The present invention suggests the following ways to adaptively adjust both the GOP length 45 and GOP structure, in order to improve the perceived coding quality of a particular sequence of pictures:

1) Extend or decrease the GOP length based on scene changes—referred to as Adaptive GOP Length.

2) Switching off the B pictures in the Sub-GOP based on the video content—referred to as Adaptive GOP Structure.

A scene change may be either a typical scene cut in a movie, or else a splice point between different original video sources.

To adapt the GOP length 45 and the GOP Structure based on the content, the proposed method uses the information from different modules in the pre-processing stage of video coding, which is a processing stage that precedes coding proper, and its task is to analyse the incoming video pictures and provide advanced information on them which steers the video encoder to make optimum coding decisions.

It uses such information as: information from analysis of hierarchical Motion Estimation (ME); spatial complexity metrics; scene cut detection; fade detection and flash detection. Each of these modules is shown in the pre-processor apparatus according to an embodiment of the present invention in FIG. 2. However, other modules, detecting other metrics, may be used instead of, or in addition to, the modules shown.

Figure 2:
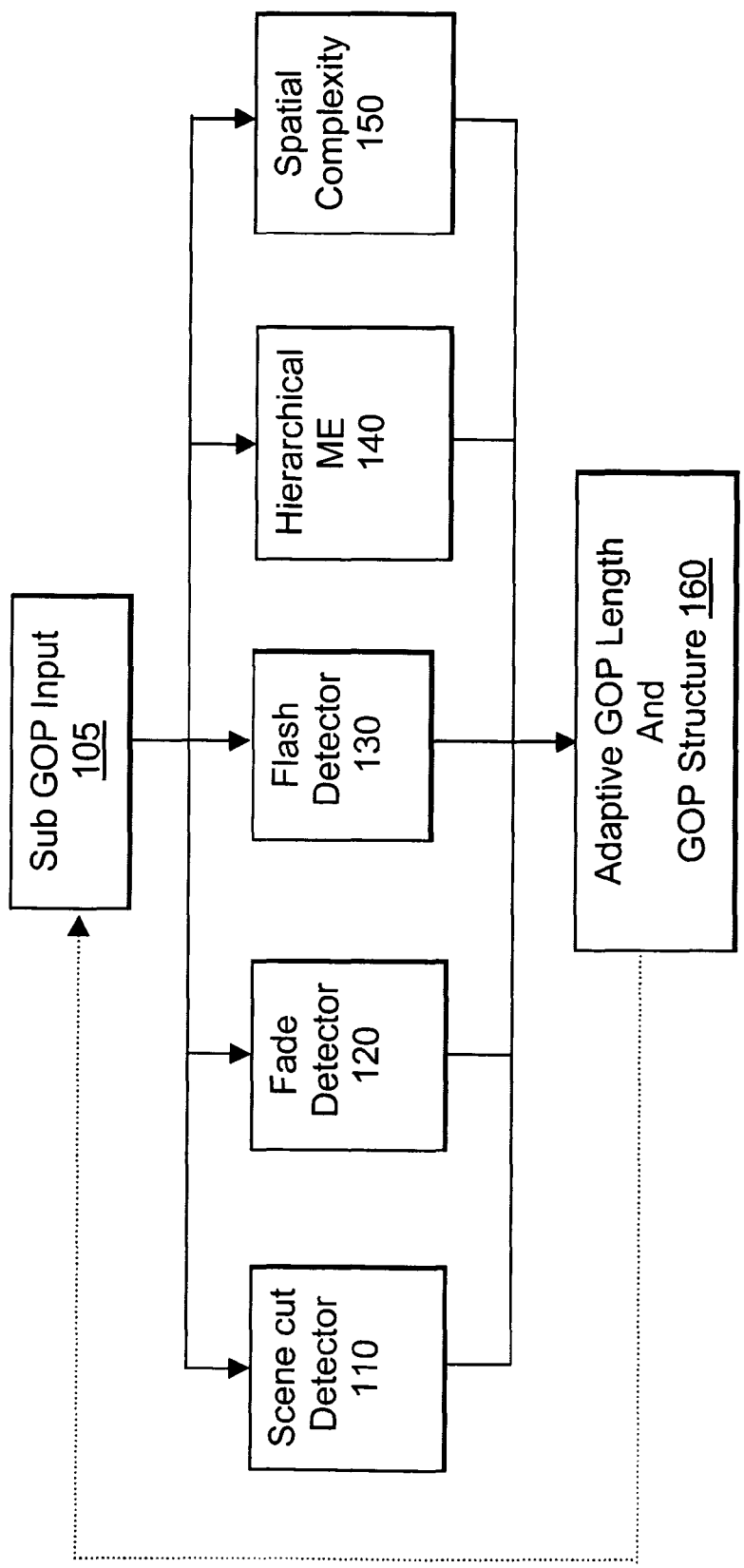
FIG. 2 shows a exemplary high level block schematic diagram of the Adaptive GOP Length and GOP Structure pre-processing apparatus according to an embodiment of the invention.

In particular, FIG. 2 shows a Sub-GOP input 105 for the pre-processing stages 110-150, with the outputs of the pre-processing stages 110-150 being used to create the Adaptive GOP length and structure 160 of the output sequence of video picture data frames.

Describing FIG. 2 in more detail, the scene cut detector 110 informs the GOP adaptation circuit about the beginning of a new shot as well as the position of the new shot with respect to the frame or field in which it is contained (i.e. scene cut in frame, scene cut in top field or scene cut in bottom field). The Scene cut detector 110 also gives the information about future scene cuts in pictures ahead of the current Sub GOP. In the preferred embodiment, the Scene cut detector looks six pictures ahead.

The fade detector 120 provides information about whether the current picture is part of a fade in, or fade out, or neither. The flash detector 130 provides a flag to inform the GOP adaptation circuit whether the current picture has camera flashes in it or not. Hierarchical Motion Estimator 140 provides temporal complexity metrics, as described in more detail below. Meanwhile, spatial complexity detector 150 detects spatial complexity, as discussed in more detail below with reference to FIG. 10.

Adaptive GOP Length

As mentioned previously, the GOP length 45 dictates the interval between consecutive I pictures. As P pictures are predicted from previous pictures, and B pictures are predicted from both previous and future pictures, motion compensation errors would propagate without the use of I pictures. The use of closed GOPs, where it is not allowed to reference a picture from a previous GOP when predicting a P or B picture, helps to change the video encoder content seamlessly, and is particularly used in the case of a splice point. Open GOPs do allow reference to previous GOPs when predicting a P or B picture, and open GOPs may allow greater compression.

Thus, an I picture needs to be inserted periodically to prevent such error propagation and thereby improve the perceived video quality. I pictures are also inserted periodically to reduce the random access time or channel change time at the decoder. At scene cuts, an I picture must be inserted as predictions would otherwise fail, due to them referencing an image no longer to do with the current image. Accordingly, an I picture needs to be inserted in the following cases:

1) At the beginning of the GOP.
2) At Scene changes (i.e. including both scene cuts and splice points).

If the scene change is a scene cut, and it happens before the beginning of the GOP, an I picture is inserted on the first reference picture after the scene cut and a new GOP is started from this inserted I picture. If the scene cut happens to fall on a non reference picture, i.e. a B picture, it is better to delay the scene cut until the next reference frame because it is known that this improves the quality of the reference pictures.

In one embodiment of the invention, the GOP length is extended if the scene change and the beginning of the GOP are within 6 frames.

Figure 3A:
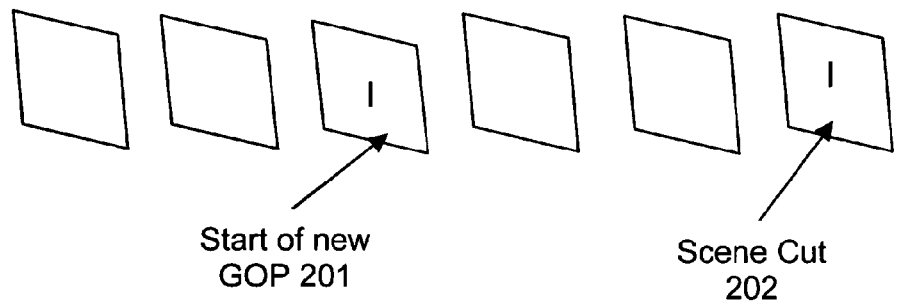
FIG. 3a shows an illustration of the relative position of a beginning of a GOP and a scene cut in a prior art sequence of video picture data.
Figure 3B:
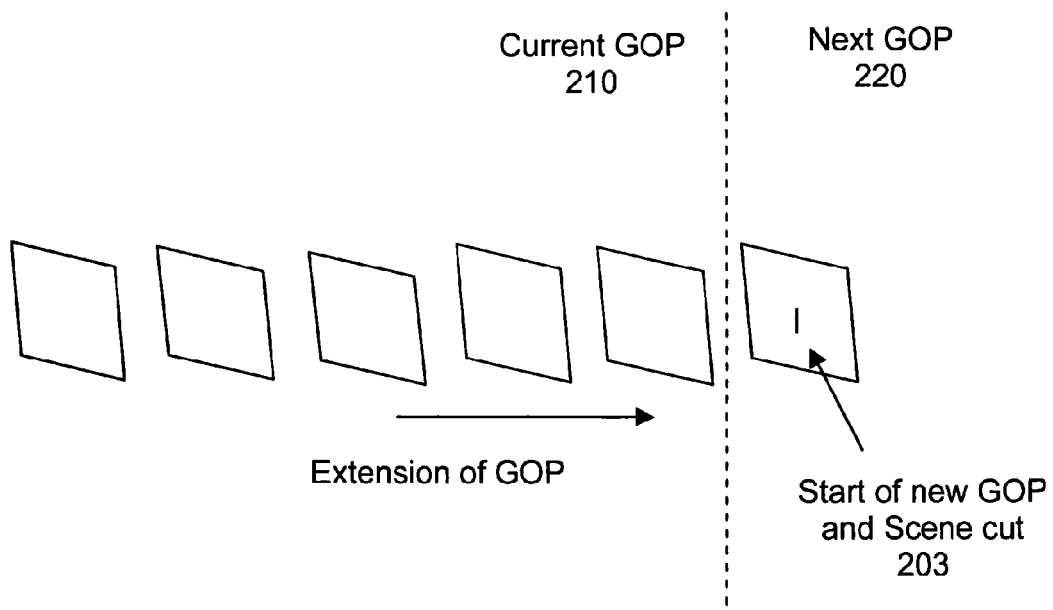

A typical scenario is shown in FIGS. 3a and 3b

Without the Adaptive GOP length method, two I pictures will be inserted close together. One occurs at the natural start of the GOP 201, according to the chosen set GOP length of the system, and the other one is inserted out of normal sequence at the scene cut 202 to prevent error propagation that would otherwise occur by referencing a picture having nothing to do with the video after the scene cut. Placing two I pictures so close together increases the amount of data to be sent to the encoder, hence can have detrimental effects on the rate control buffer store and so could potentially cause the buffer to overflow un-necessarily.

According to the present invention, the above described scenario can be handled by extending the current GOP 210 up to the point when the scene change occurs, and then starting the next GOP 220 with an I frame from the first scene change picture 203, thus avoiding the insertion of two I pictures close together. In the present invention, the current GOP 210 (length) is considered to be the (length of the) GOP located before the scene change, while the next GOP 220 (length) is considered to be the (length of the) GOP after the scene change. This is illustrated in FIG. 3b. A similar current/next naming protocol is equally applied to the sub-GOPs in this description.

In the present invention, a scene change may comprise either a "traditional" scene cut within a video (for example, a movie changing from inside to outside a building), or it may comprise splice point (for example, a movie going to an advertising break). Further discussion of splice points, and the particular issues surrounding their application, is found below.

Figure 4A:
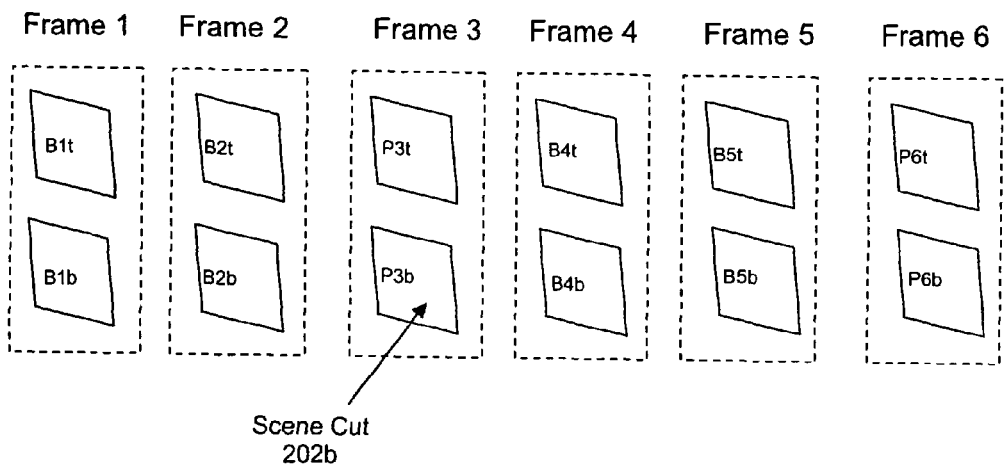
FIG. 4a shows an illustration of when a scene cut occurs in the last field of the reference picture of a current sub-GOP.
Figure 4B:
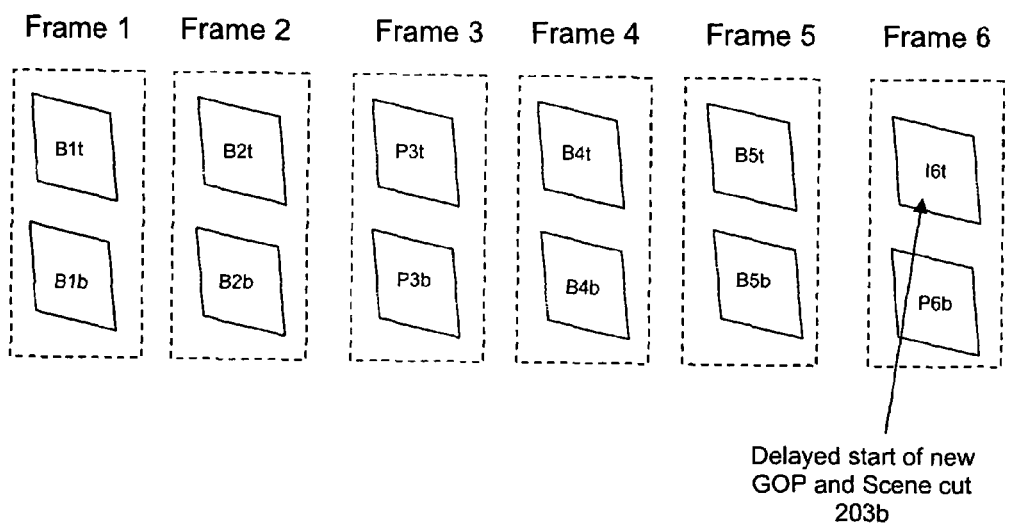

FIGS. 4a and 4b show how the method deals with the special case where the sequence of video data is interlaced (i.e. comprises fields), and a scene cut happens to fall on the bottom field of a last picture of the Sub-GOP 202b, i.e. on the reference picture (a P picture, not a B picture). In this situation, it is preferable that an I frame is inserted on the next Sub-GOP's reference picture 203b, rather than at the scene cut point itself—i.e. a delayed scene cut. Note, in FIGS. 4a and 4b, there is shown a sample of B and P fields forming frames in the form BBPBBP, i.e. two sub-GOPs worth. The fields of the frames are numbered consecutively, with "t" denoting the top field, and "b" denoting the bottom field.

A more detailed set of example video frame sequences (i.e. non-interlaced video), depicting the effect of the adaptive GOP length method portion of the invention will now be described using FIGS. 5 to 9, where the picture type produced for each frame number of an output video sequence is given. Note, the frames may be formed of two fields, as used in FIGS. 4a and 4b, in the case of interlaced video.

FIG. 5 shows the display order of a starting MPEG2 Encoder video coding scenario with Sub-GOP length 3 and GOP length 45. In this case, a new GOP 201 is started every 16 frames.

However, if a scene cut 202 happens at frame number 12 without the adaptive GOP length method of the present invention being applied, the video encoder produces the picture sequence output as shown in FIG. 6. In this case, a scene cut 202 occurs on frame 12, with only two B frames existing before the I frame that starts the next GOP 204 occurs (according to the length 45 of the fixed-length GOP used—which is 15 in this case). Thus, in effect, a very short GOP has occurred—resulting in two larger sized I frames occurring in a very short amount of time. This leads to higher than average bitrates at this point.

Whereas, if the Adaptive GOP length method of the invention is applied to FIG. 5, the picture sequence of FIG. 7 is produced. In this case, the current GOP length has been reduced to take into account the scene change 202 at frame 12. Hence, the I frame of the next GOP and the scene cut are combined 203 at frame 12, with a new GOP starting "out of sequence" from frame 12, i.e. not at the expected location when fixed GOP lengths of 15 are used. This has involved decreasing the size of the current GOP.

In a second example, a scene cut 202 happens at frame number 21. Without adaptive GOP length method, the video encoder produces the video sequence output shown in FIG. 8. Again, it can be seen that there are two I frames occurring in a relatively short time frame (at frame 15 and 21 respectively), and so the video bitrate has gone up.

However, with the proposed adaptive GOP length method applied, the sequence output is as shown in FIG. 9. Now, the first (current) GOP has been extended so that the start of the next GOP 203 coincides with the scene change at frame 21.

In each case where the start of the next GOP is combined with a scene cut, the intermediary frames are filled according to the normal Sub-GOP structure—BBP, unless a particular scenario exists which requires a different structure, as discussed in more detail below, particularly with reference to FIG. 13. Where a GOP is shortened, it applies the typical GOP end structure—BBI, also unless a particular scenario exists requiring the use of P pictures instead, such as that described below.

Adaptive GOP Structure

In a Sub-GOP Length, it is a good idea to turn off B pictures based on the video content of the video picture data, depending on the spatial and temporal complexity metrics of the video content. For example, sequences with fast pans are better coded by turning off the B pictures.

Thus, the present invention may also utilise an assessment of certain metrics, in order to determine an optimised Sub-GOP structure. The metrics may include: spatial complexity metrics; temporal complexity metrics; fade activity metrics (information about fades in the video sequence), flash activity metrics (information about flashes in the video sequence), scene cuts metrics and bit rates metrics (bit rate of the video encoder).

The GOP adaptation circuit may be adapted to carry out an adaptation of the GOP structure without the GOP length being altered.

Computation of Spatial Complexity

Spatial complexity is derived from the sum of horizontal and vertical activity of the sequence. A sequence with less spatial complexity has more redundancy in the spatial domain and vice versa. Vertical activity denotes the spatial consistency between the adjacent rows of the picture, whereas the horizontal activity denotes the spatial consistency between neighbourhood pixels in horizontal direction. Horizontal activity is the weighted sum of pixels in the horizontal direction and vertical activity is the weighted sum of pixels in the vertical direction.

FIG. 10 shows an exemplary 4×4 block of pixels used in spatial complexity computation according to an embodiment of the invention. In the following, exemplary computations of horizontal and vertical activities are explained with an example for pixel position 'a1' of FIG. 10.

Horizontal activity (of Line N)=abs(a0+a1−a2−a3)/16
Vertical activity (of $2^{nd}$ column)=abs(a1−b1)/16.

Where 'abs' is the absolute function.

Lines are used for notational representation, where Line N+1 is one row below Line N, therefore they are separated by a Picture Width number of pixels (i.e. the number of pixels across the video).

Horizontal activity and vertical activity is computed and accumulated for all the pixels in the picture by applying the above equation to each pixel in turn.

For interlaced pictures, horizontal and vertical activities are computed separately for both top field and bottom field.

Spatial complexity is then derived from the sum of horizontal and vertical activity.

Spatial complexity may be computed as follows:

For Progressive pictures:

Spatial complexity=(horizontal activity+vertical activity)/32

For Interlaced Pictures:

Spatial complexity=(Top Field horizontal activity+Bottom Field horizontal activity+Top Field Vertical activity+Bottom field vertical activity)/32

The above uses a scale factor (32 in the example shown) to reduce the size of the numbers used.

Spatial complexity is computed for every picture in the sub GOP and averaged for the sub GOP which will be used in adapting the GOP Structure.

Computation of Temporal complexity To compute an estimate of temporal complexity, hierarchical motion estimation is performed between consecutive pictures at a macroblock level. In a typical implementation, the macroblock consists of 16×16 pixels of the picture (i.e. 256 pixels per macroblock). Motion vectors for each macro block and its corresponding Sum of Absolute Differences (SAD) values are computed. Temporal complexity metrics whose use prove advantageous in the present invention are:

1) Temporal Distortion.
2) Temporal Displacement.

Temporal Distortion is the average of the SAD values for all macroblocks and Temporal Displacement is the average of an absolute sum of motion vectors of all macroblocks.

Temporal Distortion=Sum of SADs for all Macro blocks divide by number of Macro blocks in the picture Temporal Displacement=Sum of absolute sum of Horizontal and Vertical motion vector for all macroblocks divide by number of macroblocks in the picture.

Temporal distortion and temporal displacement are computed for every picture in the Sub GOP and they are averaged for the Sub GOP.

Depending on the Spatial and Temporal complexity of the sequence, B pictures are turned off if:

1) The sequence has high activity in the temporal domain, i.e. high temporal complexity (meaning high temporal distortion and/or high temporal displacement)
2) The sequence has very low spatial and temporal complexity at lower bit rates (as the skip criterion for P pictures is more relaxed compared to B pictures for MPEG2)

The proposed Adaptive GOP Structure method is explained using the below pseudo code, assuming a macroblock size of 16 by 16 pixels, i.e. 256 pixels per macroblock:

```
If ( (Temporal Displacement >= 16) OR
    (Temporal Distortion >= 256*16) OR
    (Temporal Displacement <= 5 AND Spatial complexity <=
    2560 AND BitRate <= 2MBPS) )
{
    Turn off B pictures.
}
```

The temporal distortion is measured per pixel and then summed for a macroblock. Hence, it can be seen that the above code requires the temporal distortion to be greater than or equal to 16 per pixel in the macroblock.

The above test is applied to every picture in a Sub GOP length. The specific values of parameter used above that set the thresholds in this method have been found by experiment to be advantageous in practice, when a 16 by 16 macroblock is used. Proportionally sized values may be used for different sizes of macroblock, and image/video size.

When fades or flashes are detected in the video then a PPP structure cannot be selected, and instead they are encoded as BBP or BBI.

A set of example video frame sequences depicting the effect of the adaptive GOP structure portion of the invention will now be described using FIGS. 5, 11 and 12, where the picture type produced for each frame number of an output video sequence is given.

FIG. 5 is the initial starting video sequence.

FIG. 11 shows the display order of a video sequence with very fast motion content between frames 13 to 23 and without adaptive GOP method applied.

FIG. 12 shows the display order of the same video sequence with very fast motion between frames 13 and 23, but with the adaptive GOP structure method applied.

It can be seen that the adaptive GOP structure method has converted all instances of B pictures usually used in the sub-GOPs into P pictures when there is very fast movement detected. In this example, there is no change in the GOP lengths.

Handling Splice Points

It is common in digital broadcast distribution networks that streams of coded material are modified for various purposes. For example, at a cable station head, incoming streams are selected and re-multiplexed for forward transmission. In this process, called splicing, it is sometimes necessary to edit the video material to add, remove or replace sections, e.g. advertisements, and this is usually done in the compressed domain to avoid the costs and quality penalty of decoding and then recoding.

Because splice points inherently involve a complete change of image, frames after the splice point should not use any of the frames from prior to the splice point as references in the predictions used in video compression. Otherwise, erroneous predictions will occur, leading to poor compression or artefacts. Accordingly, a splice point must close the GOP prior to the splice point (which stops backward predictions being used in the later frames, as discussed above), i.e. splice points must use closed GOPs. Using a closed GOP means that the picture before the splice point must be either an I picture, or a P picture.

Such a restriction does not occur when there is a simple scene cut, and thus open GOPs can be used in this case.

At such splice points, it is not always convenient to force the splice point to a known GOP boundary and so the present invention may be used. This is a form of special case scenario of the above described GOP boundary problem highlighted by FIGS. 5 to 9. In this case, an I picture or P picture needs to be inserted at a desired splice point, and its previous picture must be coded as a P picture. So if a splice point is required in a Sub-GOP, that Sub-GOP structure is changed to contain all P pictures and an I picture is inserted at the splice point.

Figure 13:
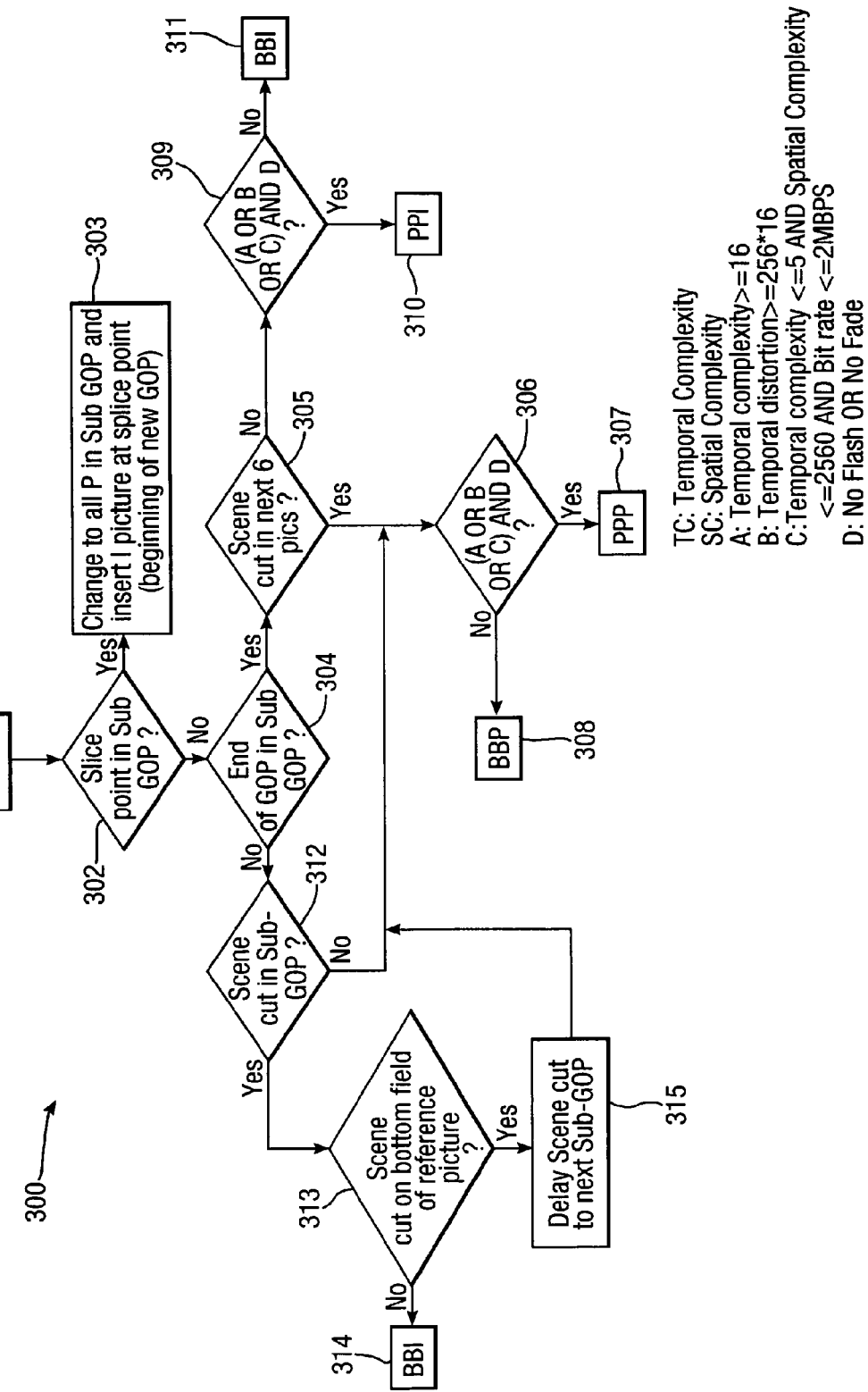
FIG. 13 shows an exemplary flow chart of an Adaptive GOP Length and GOP Structure method according to an embodiment of the invention.

FIG. 13 shows a flowchart detailing an exemplary application of how the present invention assigns a picture structure to a Sub-GOP using a combination of the adaptive GOP length and structure methods described above, together with splice point handling, for the case where each picture is a frame, i.e. the GOP structure is formed out of I frames, P frames or B frames, as indicated. The example shown uses a Sub-GOP size of 3. Where a larger Sub-GOP size is used, the last frame type of the proposed Sub-GOP structure is repeated.

The method 300 is applied to the original frame sequence, one Sub-GOP at a time, starting with the Sub-GOP 60 after the first picture 50. The method restarts for each new Sub-GOP.

The method starts at START 301. First the Sub-GOP is analysed at step 302 to see if it contains a splice point. If it does contain a splice point, then at step 303 all frames in the Sub-GOP are changed to P frames, and an I frame is inserted at the splice point (which begins a new GOP). The method then may start afresh for the next Sub-GOP.

If there is no splice point present in the Sub-GOP at step 302, then the same Sub-GOP is analysed to see if it is the final Sub-GOP of the GOP at step 304.

If the Sub-GOP under test is the final Sub-GOP of the GOP, then the video sequence is checked to see if a scene cut occurs within the next six frames (i.e. two Sub-GOP lengths) at step 305.

In the preferred embodiment, a six frame look ahead frame count is used because a longer look ahead increases the latency of encoding and increases the frame buffer storage requirements. This is to say, the choice of a six frame look ahead window has found to be advantageous in real world tests given a certain set of requirements for the encoder performance. However, other window sizes may equally be used in different encoder requirement scenarios and GOP/sub-GOP lengths used in the source digital video.

If a scene cut does occur, the method moves to step 306, where it carries out the above described calculations using temporal complexity, special complexity, temporal distortion, video bit rate, flash/fade presence, in order to determine the Sub-GOP structure used at the scene cut.

In particular, the method calculates the answer to the following Boolean equation: (A OR B OR C) AND D, where:

A=is the temporal complexity greater than or equal to 16;

B=is the temporal distortion greater than or equal to (256*16);

C=is the temporal complexity less than or equal to 5 AND spatial complexity is less than or equal to 2560 AND video bit rate greater than or equal to 2 Mbps (megabits per second).

D=No Flash occurs AND No Fade occurs, where AND and OR are Boolean operators.

The output of this equation is either 1 (=yes), or 0=(no), and decides the output structure as shown in FIG. 13, namely: BBP where the answer is 0 (step 308), and PPP where the answer is 1 (step 307).

Moving back to step 305, if there is no scene cut within the next six frames, the same equation as described above for step 306 is used at step 309, however the result of the answer changes to: an output final Sub-GOP structure BBI where the answer is 0 (step 311), and an output final Sub-GOP structure PPI where the answer is 1 (step 310). Hence the current GOP is ended, and a new GOP is started with a B or P frame being used subsequently, depending on, for example speed of pan of video.

Moving back to step 304, if the Sub-GOP under test is not the final Sub-GOP of the GOP, the Sub-GOP is tested to see if contains a scene cut at step 312.

If there is no scene cut in the Sub-GOP under test, the method moves back to step 306, as already described in detail above. However, if there is a scene cut in the Sub-GOP under test, then the method moves to step 313, where it tests more specifically whether the scene cut occurs in the bottom field of the reference picture (or not). If it does not, then the Sub-GOP structure BBI is used (step 314). If it does, then the scene cut is delayed until the next Sub-GOP (step 315) and the method moves onto step 306 again.

The above method extends the current GOP length based on the presence of a scene cut. While processing the last Sub-GOP of the GOP, if scene cut detector indicates that there is a scene cut within 2 sub-GOP lengths, then an I frame is not inserted in the current Sub-GOP, but delayed until the next sub-GOP. While processing the next Sub-GOP (containing the scene cut), then an I picture is inserted here, and hence the GOP length is extended.

If a scene cut happens out of sync with the GOP size, i.e. on either of the two B pictures of a typical BBP structure of a Sub-GOP of length three, then an I picture is inserted on the last picture of the Sub-GOP (where the P picture was previously), i.e. a delayed scene cut. This is to say, if a scene cut happens to fall on non reference pictures, i.e. a B picture, the insertion of an I frame for a scene cut is delayed until the next reference picture after the scene cut. This is because B pictures use both forward and backward prediction, and while its forward prediction would go wrong, its backward prediction would be correct, thus if the scene cut falls on the B picture then there is no need to insert an I frame immediately.

By using the above generally described embodiment of the invention, the correct structure of Sub-GOP to use may be chosen according to the actual attributes of the video sequence being encoded. Thus, a more efficient video output stream or sequence is realised.

It would be appreciated by the skilled person that only a sub portion of the flowchart may be implemented in any given implementation, depending on what the implementation is meant to handle. For example, in some implementations, the method may not be arranged to handle splice points because no splice points are expected in the source video sequences.

In some embodiments of the invention, only the adaptive GOP structure portion of the method is implemented. In this case, the GOP lengths are not altered, but only their structure, according to the detected metrics.

The above described methods maybe carried out by any suitably adapted hardware, and as such, the method may be embodied in a set of instructions, stored on a computer readable medium, which when loaded into a computer, Digital Signal Processor (DSP) or similar, causes the computer to carry out the hereinbefore described method.

Equally, the method may be embodied as a specially programmed, or hardware designed, integrated circuit which operates to carry out the method on image data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or location video uplink van supporting an in-the-field news team.

Figure 14:
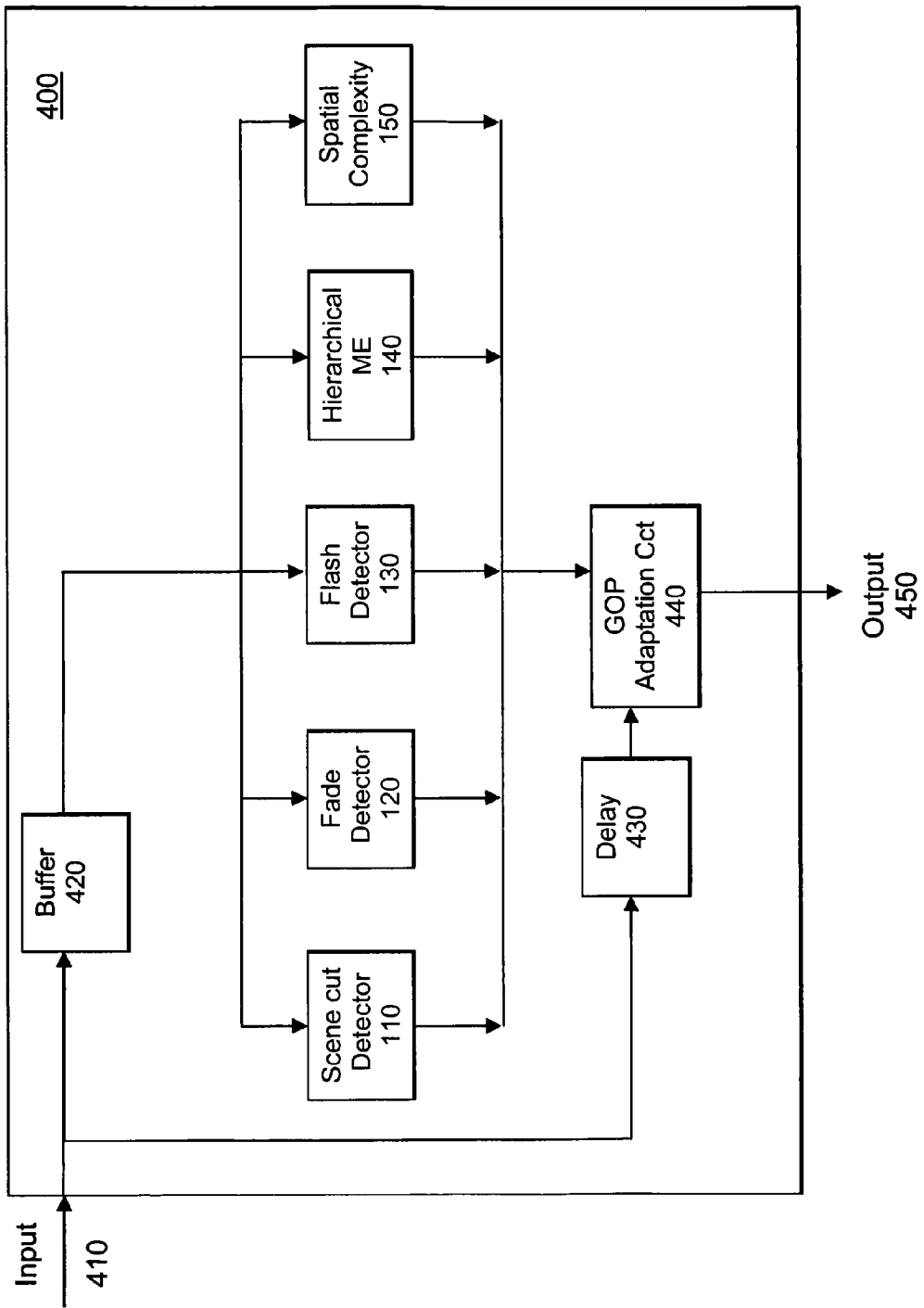
FIG. 14 shows a more detailed exemplary high level schematic of hardware adapted to carry out the method according to an embodiment of the invention.

Another exemplary hardware embodiment of the present invention is that of a video pre-processor made out of an Application Specific Integrated Circuit (ASIC) as shown in FIG. 14.

In FIG. 14, the pre-processor ASIC 400 comprises an Input 410, feeding into buffer 420 and delay 430. Buffer 420 stores an incoming sequence of video picture data, which it provides to each of the detectors 110 to 150. The detectors 110 to 150 use buffered video picture data to derive the metrics used by the GOP adaption process according to an embodiment of the invention. Each of the detectors operates as discussed above with reference to FIG. 2.

The outputs of the detectors 110 to 150 provide the metrics used in the GOP adaptation method to the GOP adaptation circuit 440. The GOP adaptation circuit 440 uses the supplied metrics, and an incoming delayed version of the video picture data, to generate information about how a subsequent video encoder (not shown) is to adapt GOP lengths and structures. The delay 430 ensures the detectors have enough time to carry out their detection processes before GOP adaptation circuit 440 operates on the sequence of video data. Without the delay 430, the metrics for a previous Sub-GOP would be used on the present sub-GOP.

The pre-processing of the video data according to the invention may be incorporated into the video encoder, if a particular implementation demands it.

The GOP adaptation circuit 440 outputs information for use by a subsequent video encoder about how the video encoder is to adapt the sequence of video picture data at output 450.

Buffer 420 is sized according to specific needs of the implementation of the method according to an embodiment of the invention, most particularly, the size of the look ahead window. In a preferred embodiment, the buffer is sized to store the current sub-GOP and six pictures ahead of the current picture (i.e. nine pictures, in the given example of Sub-GOP length 3).

It will be apparent to the skilled person that the exact order and content of the steps carried out in the method described herein may be altered according to the requirements of a particular set of execution parameters, such as speed of execution, type of information being detected, accuracy of detection, and the like. Accordingly, the claim numbering is not to be construed as a strict limitation on the ability to move steps between claims, and as such portions of dependent claims maybe utilised freely.

The invention claimed is:

1. A method of pre-processing a sequence of video picture data, said sequence of video picture data comprising I pictures, P pictures and B pictures arranged as a plurality of Group Of Pictures, GOPs, and each of said plurality of Group Of Pictures having a first picture and a plurality of Sub Group of Pictures, Sub-GOPs, the method comprising:
analysing the sequence of video picture data;
determining a position of a scene change relative to a position of a start of a new GOP within the sequence of video picture data; and
providing information to a video encoder indicative of moving the start of the new GOP to coincide with the scene change by extending or decreasing a current GOP length, if the scene change and the start of a new GOP are within a predetermined number of pictures,
wherein, if the information provided indicates to move the start of the new GOP by extending the current GOP length, the step of extending comprises:
creating one or more new Sub-GOPs out of P and B pictures; and
inserting the newly created one or more Sub-GOPs into the current GOP until the current GOP is of a sufficient length;
wherein the step of creating the one or more new Sub-GOP comprises:
providing a first P picture as the last picture of the one or more sub-GOP; and
inserting B or P pictures previous to the first P picture up to a desired length of Sub-GOP,
wherein a picture type content of the pictures inserted in to a newly-created Sub-GOP is B type pictures, unless an analysis of the sequence of video picture data finds the following Boolean equation to be true:

(Temporal displacement of the sequence of video picture data≥first predetermined value) OR (Temporal distortion of the sequence of video picture data≥second predetermined value) OR (Temporal displacement≤third predetermined value AND Spatial complexity≤fourth predetermined value AND bitrate<a predetermined rate) AND (no flashes occur OR no fades occur);

wherein if found true, then P pictures are used in the newly created sub-GOP; wherein;
temporal displacement and temporal distortion are temporal complexity metrics;
flash activity metrics comprise detecting whether flashes occur in a Sub-GOP under test, to provide the 'no flashes occur' Boolean value; and fade activity metrics comprise detecting whether a fade occurs in the Sub-GOP under test, to provide the 'no fades occur' Boolean value.

2. The method of claim 1, wherein, if the information provided indicates to move the start of the new GOP by decreasing the current GOP length, the step of decreasing the current GOP length comprises:
   inserting an I picture as a first picture of a new GOP at the scene change to start a new GOP;
   creating one or more new Sub-GOPs out of P and B pictures; and
   inserting the newly created one or more Sub-GOPs into the new GOP until the new GOP is of a sufficient length;
   wherein the step of creating the one or more new Sub-GOP comprises;
   providing a first P picture as the last picture of the one or more sub-GOP; and
   inserting B or P pictures previous to the first P picture up to a desired length of Sub-GOP.

3. A method of pre-processing a sequence of video picture data, said sequence of video picture, data comprising I pictures, P pictures and pictures arranged as a plurality of Group Of Pictures, GOPs, and each of said plurality of Group Of Pictures having a first picture and a plurality of Sub Group of Pictures, Sub-GOPs, the method comprising:
   analysing the sequence of video picture data;
   determining a position of a scene change relative to a position of a start of a new GOP within the sequence of video picture data; and
   providing information to a video encoder indicative of moving the start of the new GOP to coincide with the scene change by extending or decreasing a current GOP length, if the scene chance and the start of a new GOP are within a predetermined number of pictures,
   wherein, if the information provided indicates to move the start of the new GOP by extending the current GOP length, the step of extending comprises:
      creating one or more new Sub-GOPs out of P and B pictures; and
      inserting the newly created one or more Sub-GOPs into the current GOP until the current GOP is of a sufficient length;
   wherein the step of creating the one or more new Sub-GOP comprises:
      providing a first P picture as the last picture of the one or more sub-GOP, and
      inserting B or P pictures previous to the first P picture up to a desired length of Sub-GOP,
   wherein a picture type of the pictures inserted into a newly created Sub-GOP is dependent on metrics of the video picture data,
   including:
   Spatial complexity metrics;
   Temporal complexity metrics;
   Fade activity metrics;
   Flash activity metrics;
   Scene change metrics; and
   Bit rate metrics.

4. The method of claim 1, wherein the first predetermined value is 16, the second predetermined value is (256*16), the third predetermined value is 5, the fourth predetermined value is 2560, and the predetermined bitrate is 2 megabits per second.

5. The method of claim 1, wherein a scene change comprises a scene cut or splice point in an edited sequence of video data.

6. The method of claim 5, wherein if the scene change is a splice point, the method further comprises providing information to the encoder indicative of:
   inserting an I picture at the splice point; and
   converting all pictures in the Sub-GOP preceding the splice point into P pictures.

7. The method of claim 5, wherein the sequence of video picture data comprises interlaced video data such that each picture comprises a top and bottom field, and if the scene change is a scene cut, the method further comprises providing information to the encoder indicative of:
   inserting an I picture on a reference picture of the next sub-GOP if the scene cut occurs on a bottom field of a last picture of the sub-GOP under test.

8. The method of claim 1, wherein the predetermined number of pictures is 6.

9. The method of claim 1, wherein the method is applied to each Sub-GOP in a sequence of video picture data in turn.

10. A video pre-processor apparatus for pre-processing a sequence of video picture data, said sequence of video picture data comprising I pictures, P pictures and B pictures arranged as a plurality of Group Of Pictures (GOP) and each said Group Of Pictures having a first picture and a plurality of Sub Group of Pictures (SubGOP), the apparatus comprising:
   a video sequence analyser configured to analyse the sequence of video picture data, including a position determination processor configured to determining a position of a scene change relative to a position of a start of a new GOP within the sequence of video picture data; and
   a GOP adaptation circuit configured to provide information to a video encoder such that the video encoder moves the start of the new GOP to coincide with the scene change by extending or decreasing a current GOP length dependent upon output metrics of the video sequence analyser, if the scene change and the start of a new GOP are within a predetermined number of pictures,
   wherein, if the information provided indicates to move the start of the new GOP by extending the current GOP length, the video encoder is configured to extend a current GOP length by:
      creating one or more new Sub-GOPs out of P and B pictures; and
      inserting the newly created one or more Sub-GOPs into the current GOP until the current GOP is of a sufficient length;
   wherein creating the one or more new Sub-GOP includes:
      providing a first P picture as the last picture of the one or more sub-GOP; and
      inserting B or P pictures previous to the first P picture up to a desired length of Sub-GOP,
   wherein a picture type content of the pictures inserted in to a newly-created Sub-GOP is B type pictures, unless an analysis of the sequence of video picture data finds the following Boolean equation to be true:

(Temporal displacement of the sequence of video picture data≥first predetermined value) OR (Temporal distortion of the sequence of video picture data≥second predetermined value) OR (Temporal displacement≤third predetermined value AND Spatial complexity≤fourth predetermined value AND bitrate<a predetermined rate AND (no flashes occur OR no fades occur);

wherein if found true, then P pictures are used in the newly created sub-GOP; wherein:

temporal displacement and temporal distortion are temporal complexity metrics;

flash activity metrics comprise detecting whether flashes occur in a Sub-GOP under test, to provide the 'no flashes occurs' Boolean value; and fade activity metrics comprise detecting whether a fade occurs in the Sub-GOP under test, to provide the 'no fades occur' Boolean value.

11. The apparatus of claim 10, wherein the video sequence analyser further comprises one or more of:

a scene change detector configured to detect a scene change in the sequence of video picture data;

a fade detector configured to detect a fade in the sequence of video picture data;

a flash detector adapted to detect a flash in the sequence of video picture data;

a hierarchical motion estimator configured to provide temporal metrics of the sequence of video picture data;

a spatial complexity estimator configured to provide spatial complexity metrics of the sequence of video picture data;

a first buffer for buffering the sequence of video picture data for use in any of the detector or estimators; and a delay for delaying the output of the second buffer.

12. The apparatus of claim 10, further comprising processors.

13. A non-transitory computer-readable medium, carrying instructions, which, when executed, causes one or more computers to carry out the method of claim 1.

* * * * *

UNITED STATES PATENT AND TRADEMARK OFFICE
CERTIFICATE OF CORRECTION

| | |
|---|---|
| PATENT NO. | : 8,837,602 B2 |
| APPLICATION NO. | : 12/994036 |
| DATED | : September 16, 2014 |
| INVENTOR(S) | : Ammu et al. |

Page 1 of 1

It is certified that error appears in the above-identified patent and that said Letters Patent is hereby corrected as shown below:

In the Specification

In Column 5, Line 11, delete "shows a" and insert -- shows an --, therefor.

In Column 7, Line 50, delete "FIGS. 3a and 3b" and insert -- FIGS. 3a and 3b. --, therefor.

In Column 10, Line 19, delete "picture" and insert -- picture. --, therefor.

In Column 10, Line 30, delete "displacement)" and insert -- displacement). --, therefor.

In Column 10, Line 33, delete "MPEG2)" and insert -- MPEG2). --, therefor.

In the Claims

In Column 14, Line 62, in Claim 1, delete "wherein;" and insert -- wherein: --, therefor.

In Column 15, Line 22, in Claim 3, delete "picture, data" and insert -- picture data --, therefor.

In Column 17, Line 29, in Claim 13, delete "non-transitory computer-readable" and insert -- non-transitory, computer-readable --, therefor.

Signed and Sealed this
Ninth Day of June, 2015

Michelle K. Lee
*Director of the United States Patent and Trademark Office*